April 17, 1956 E. J. SCHAAF ET AL 2,742,045
COMBINED HARVESTING AND THRESHING MACHINE
Filed March 15, 1950 5 Sheets-Sheet 1

Inventors
EDWARD J. SCHAAF
EDWIN F. GREEDY
PHILIP S. DEVIRIAN, JR.
By Hans G. Hoffmeister
Attorney

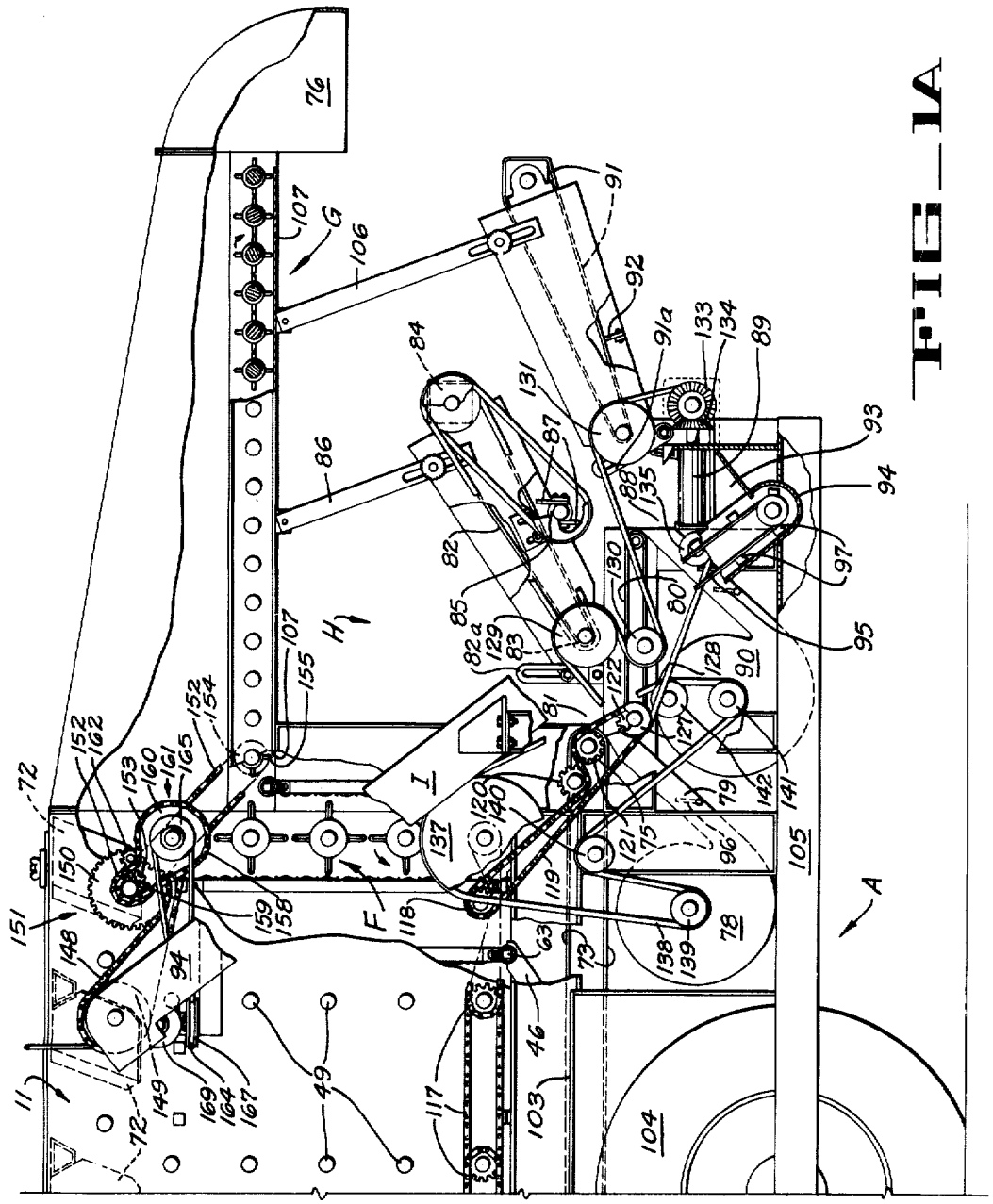

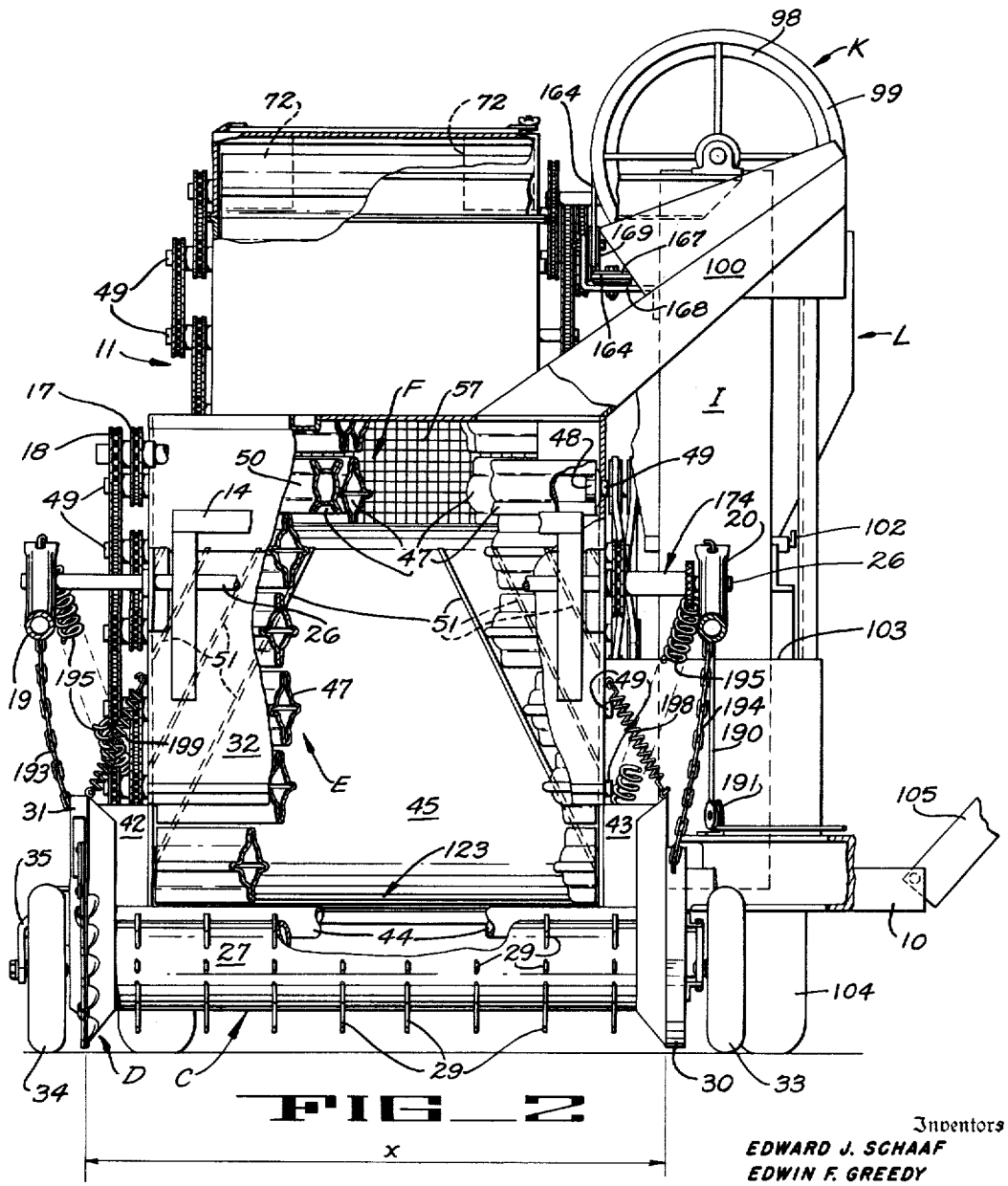

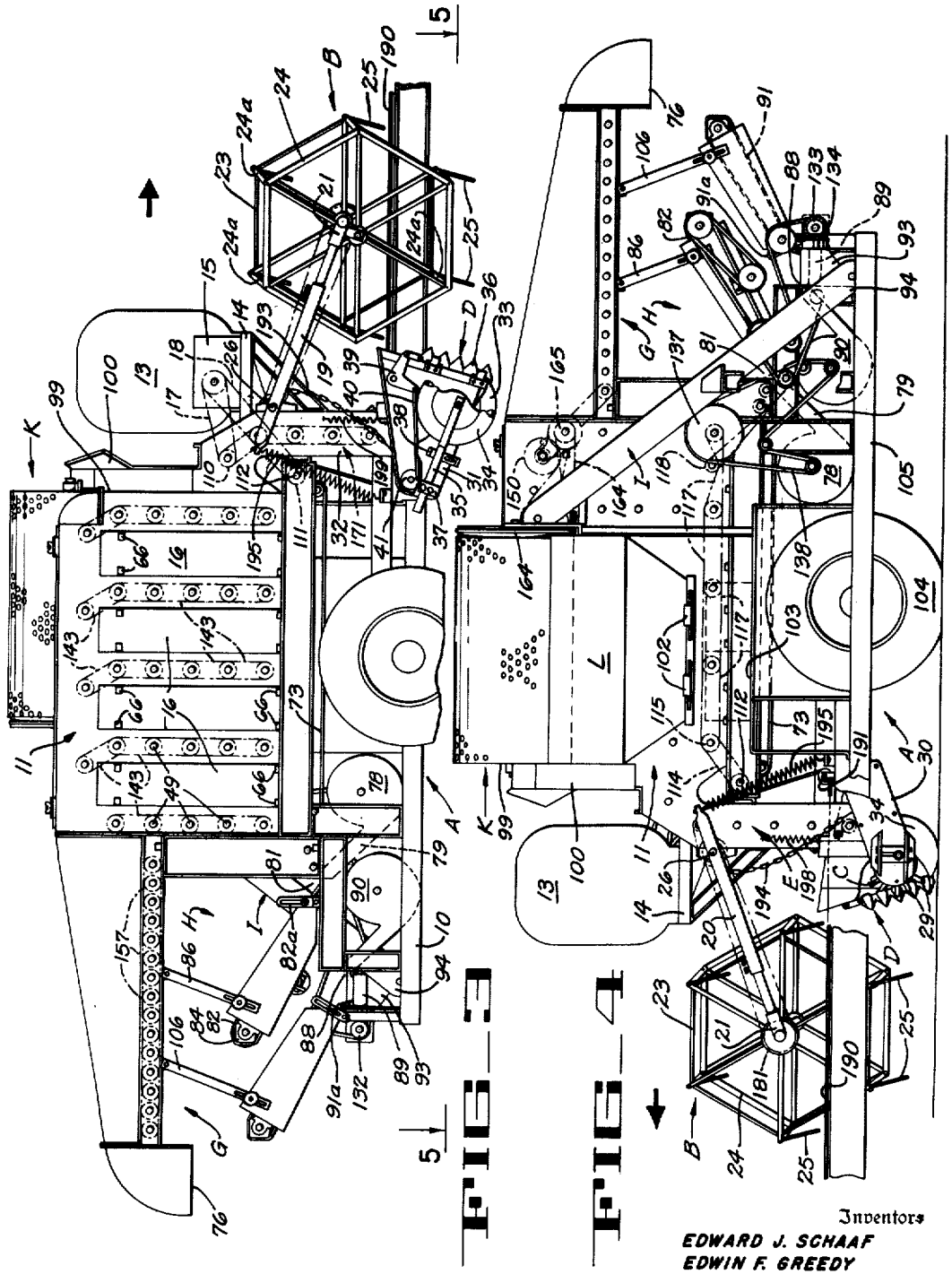

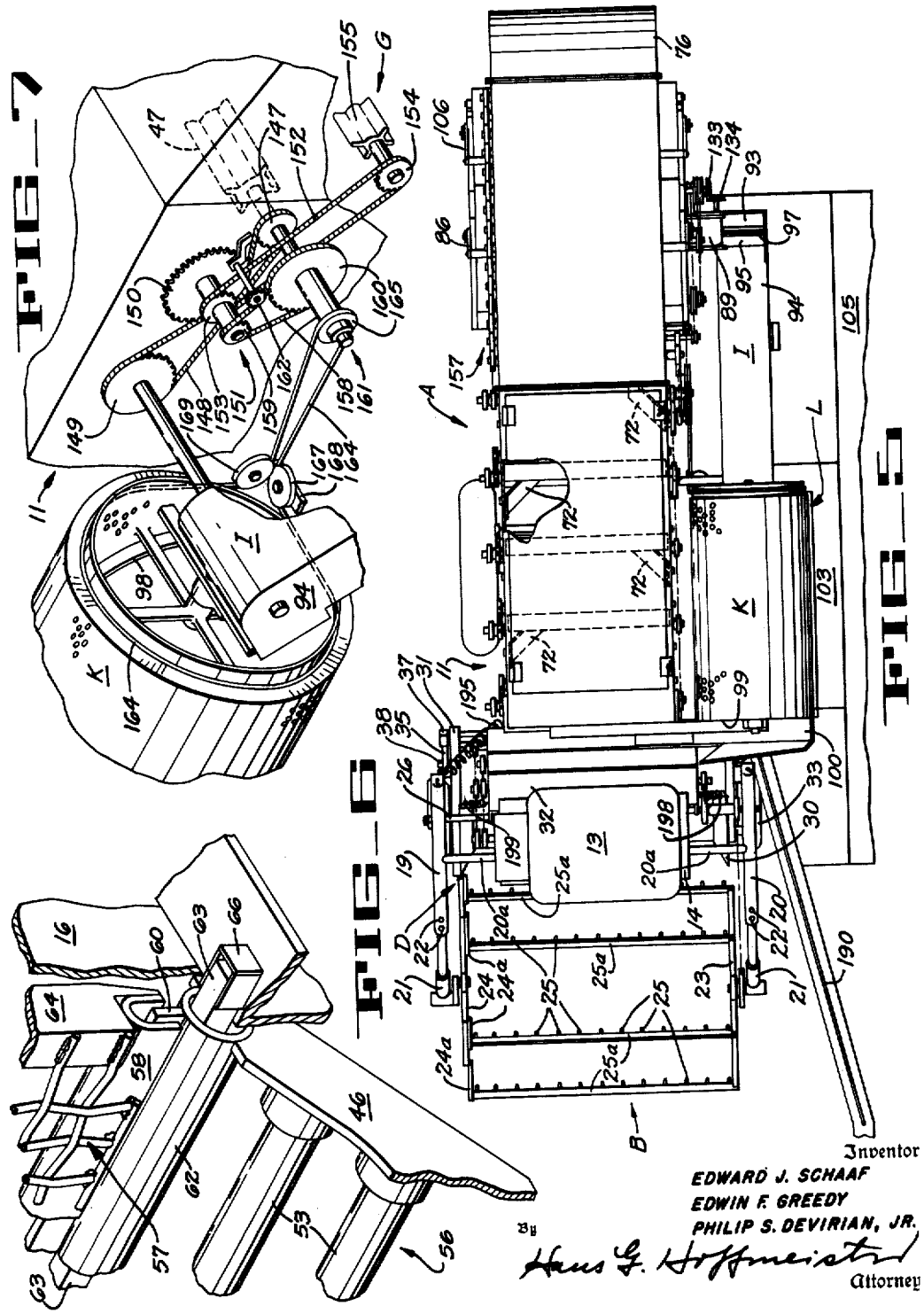

United States Patent Office 2,742,045
Patented Apr. 17, 1956

2,742,045

COMBINED HARVESTING AND THRESHING MACHINE

Edward J. Schaaf and Edwin F. Greedy, Hoopeston, Ill., and Philip S. Devirian, Jr., Santa Clara, Calif., assignors to Food Machinery and Chemical Corporation, San Jose, Calif., a corporation of Delaware Application March 15, 1950, Serial No. 149,718

11 Claims. (Cl. 130—30)

The present invention relates to a combined harvesting and threshing machine, and more particularly to a machine for the harvesting and/or threshing of crops which are difficult to handle by ordinary harvesting or threshing equipment.

An object of the invention is to make an improved harvesting and/or threshing machine.

Another object is to make an improved mechanism for picking up legume vines in a field, hulling the legumes on the vines, separating the hulled legumes and unopened pods from the mass of vines, returning the vines to the field, and transferring the hulled legumes to suitable containers while returning unopened pods back into the machine for reprocessing.

Another object is to provide a harvesting machine which will sever and pick up predetermined portions of a mass of vines lying on the ground and pass the vines into a machine for removing legumes from the pods on such vines.

Another object is to provide an improved machine which passes a mass of vines along a side of a plurality of aligned paddle bladed members which beat and abrade the vines against a screen spaced from the paddle blades.

Another object is to provide a pea vining machine with a screened wall defining a tortuous path through the machine, a plurality of flat bladed paddles being mounted in spaced relation to the wall and driven to move in cycles transversely of a surface of said wall, conveyor means being mounted beneath the screened wall to collect hulled legumes removed from the vines, and to convey the hulled legumes to a collecting point.

Another object is to cut off and remove a selected strip from a mass of legume vines matted on the ground, and to feed the vines so removed, by a plurality of paddle rotors, upwardly along a smooth wall spaced from the paddle wheels without losing any substantial portion of the legumes during such upward feeding.

Another object is to provide a plurality of vanes along a face of a plate spaced from a plurality of paddle rotors mounted to advance legume vines along said plate, said vanes being inclined toward the center of the plate in the direction of vine travel to reduce the width of dispersal of the vines over the face of said plate.

Another object is to provide in a viner improved means for separating hulled peas and unopened pods, from leaves, short portions of vines, and other litter produced by a vining process.

Another object is to introduce an angularly upwardly directed stream of air through a mass of mixed legumes, unopened pods and litter being moved along a predetermined path by a conveyor, whereby the litter is blown out of the machine and the legumes and unopened pods pass to a conveyor portion beyond the air blast.

Another object is to conduct a mass of legume vines through a vining mechanism by means of a plurality of paddle rotors arranged along a path through the machine, with vine supporting means spaced from the paddle wheels along said path, the vine supporting means having openings therein to pass legumes therethrough, and additional paddle rotors arranged to convey litter from the machine while agitating it to remove peas and pods entrained therein.

Another object is to provide, in a viner having a plurality of paddle rotors arranged along a path through the machine, restraining means extending laterally into said path to tilt rolls of vines produced by the action of the paddle rotors on the vines, thereby tending to direct such rolls lengthwise past subsequent paddle rotors in the machine.

These and other objects and advantages of the present invention will become apparent from the following description and the accompanying drawings wherein:

Figs. 1 and 1A comprise the forward and rearward portions, respectively, of a composite side elevational view of the left side of a pea harvesting machine embodying the present invention, portions of the machine being broken away.

Fig. 2 is a vertical transverse sectional view taken along line 2—2 of Fig. 1, portions thereof being broken away.

Fig. 3 is a side elevation of the machine in reduced scale showing the right hand side of the machine, portions thereof being broken away.

Fig. 4 is a side elevation showing the left hand side of the machine, drawn to the same scale as Fig. 3.

Fig. 5 is a plan view of the machine drawn to the same scale as Figs. 3 and 4, portions thereof being broken away.

Fig. 6 is an enlarged fragmentary perspective view showing the mounting arrangement for a lower end of a screen member and a portion of a curved lower grating.

Fig. 7 is a view in the nature of a fragmentary perspective view showing the driving mechanism at the top of Fig. 1A, the lateral separation between some of the chains and sprockets however being extended in the nature of an exploded view to disclose more clearly their various interrelations.

*General description*

Figure 1:
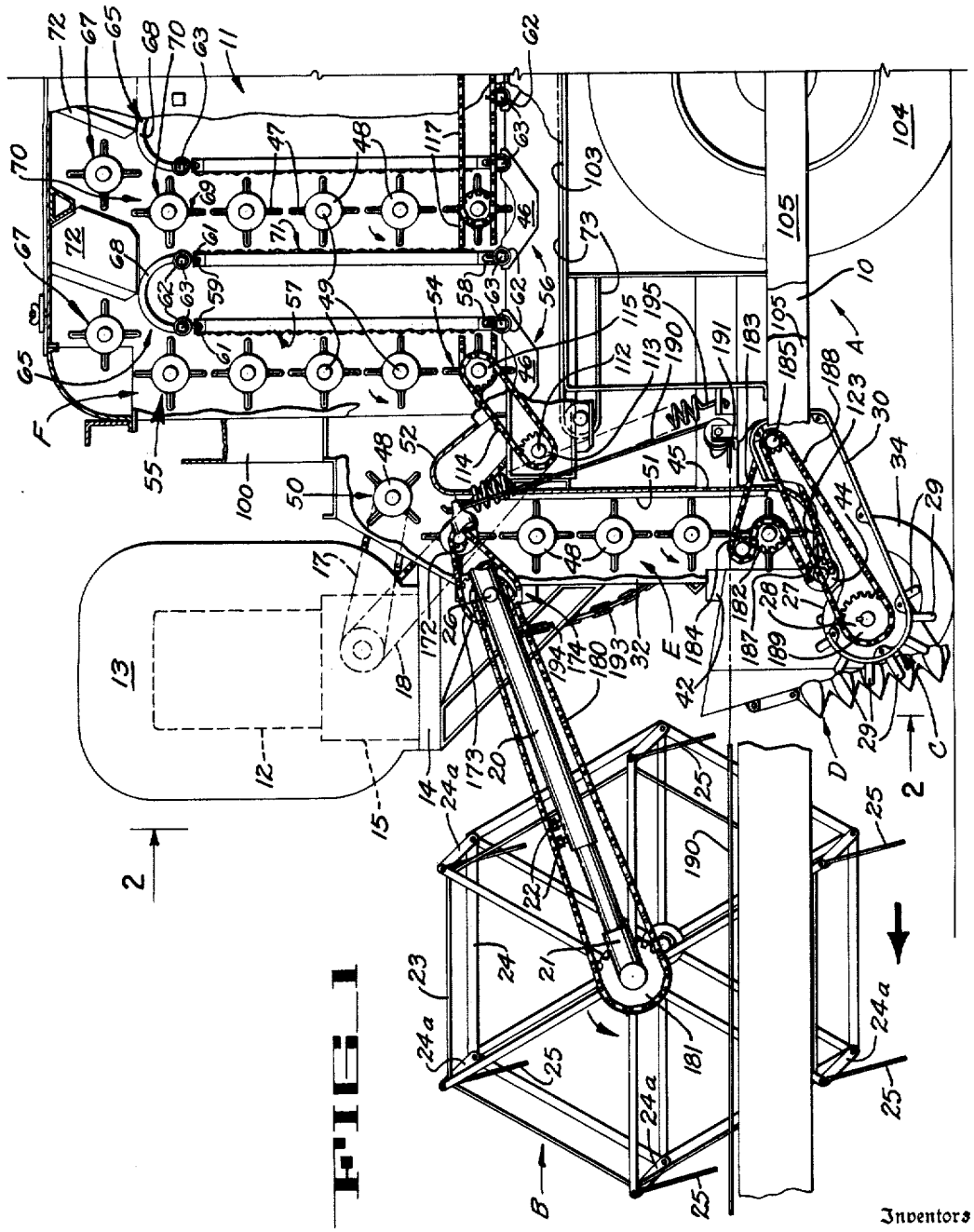

The drawings illustrate a specific embodiment of the invention which is particularly adapted to the harvesting of vine crops and the threshing of legumes such as peas. By means of slight modifications which will be obvious to those familiar with the art, the invention can be employed for use on other crops such, for example, as beans, peanuts and grain. Therefore the words "vines" and "peas" as used herein are intended to mean also such other crops as are obviously capable of being harvested and/or threshed by a mechanism embodying the invention.

The illustrated form of pick-up mechanism is particularly adapted to handle vines, but the entire remainder of the machine is not so limited. Therefore it is contemplated that other types of crop severing mechanisms such as an ordinary sickle and takeoff belt may be substituted for the illustrated vine pick-up device when the machine is intended for use in harvesting crops growing on plants other than vines. Also, while the illustrated form of the invention is provided with support wheels, and crop severing mechanism, it is obvious that the plants to be threshed could be severed and brought to the machine which in such instance could be mounted in a cannery yard or other suitable location for stationary use.

The illustrated form of the invention comprises a two wheeled body portion A adapted to be towed by a suitable powered vehicle such as an ordinary farm tractor, not shown. The hitch to the tractor is offset laterally in a well known manner so that the tractor wheels run on ground cleared of vine growth to avoid damaging the vines. Harvesting means comprising a well known type of tined lifted reel B is mounted ahead of the forward end of the body portion to loosen and comb rearwardly the vines which may be matted on the ground. A vine pick-up device C, also of a well known type, is mounted on the forward end of the body portion A to hook into the mass of vines on the ground, and sever them from the ground. A vertical cutoff device D is mounted adjacent an end of the pick-up drum, and is adapted to travel along the unharvested side of a swath of vines being harvested to sever the vines in the swath from the vines adjacent thereto. In some instances the vines cannot be effectively pulled loose from the ground and in such cases the vines are first mowed and windrowed in a usual manner, and then the vines are picked up by driving the present harvester along the windrows.

A vertical flight E of feed paddle rotors assists in pulling the vines and feeds them upwardly and then rearwardly beneath the lowermost of a first vertical flight F of paddle bladed threshing rotors. From here the vines are transported along a tortuous path through the machine in a manner to be described later herein, where they are beaten, abraded and shaken to free the peas from their pods and to shake the hulled peas from the mass of vines.

The threshed out vines are then discharged onto a discharge conveyor G composed of a plurality of paddle bladed rotors which, while conveying the vines rearwardly to a point where they are discharged back onto the field, shake out hulled peas or unopened, detached pods which may still remain in the vines.

Conveying and cleaning mechanism H is positioned to receive the peas and unopened pods which are threshed out of the vines and drop thereon. After subjecting them to air cleaning operations, to be described later herein, the peas and pods are discharged into an elevator I which in turn discharges them into a perforated rotating drum K. Here the hulled peas are separated from the filled pods, the peas are discharged into a suitable receptacle, and the unopened pods are returned into the threshing mechanism for re-processing.

Frame structure and engine

The body A comprises a channel iron frame 10 and a box-like housing 11 of a type common in the manufacture of agricultural machinery wherein structural frame members of angle or channel iron are bolted or welded together, and are covered with sheet metal panels attached to the structural members. A series of removable door panels 16 (Fig. 3) are provided along one side of the housing to provide access to the interior of the machine between adjacent vertical flights of threshing rotors and to facilitate the removal and cleaning of screen members in a manner to be described later herein.

A conventional type of gasoline engine 12 is mounted in a sheet metal housing 13 (Figs. 1, 3, 4 and 5) and is supported on a motor mount bracket 14 extending forwardly from the front end of the body A. The engine is provided with a usual type of speed reducing device 15 to drive a pair of main drive chains 17 and 18 (Figs. 1 and 2) to be referred to later herein in connection with a description of the drive mechanism for the entire machine. Throughout the present description of the machine the terms "right" and "left" will be used to indicate the right and left sides of the machine as it travels forward except as otherwise specifically designated.

It will be noted in Fig. 5 that the portion of the body which houses the threshing rotors F is narrower than that housing the feed mechanism, and the width of the swath indicated at X in Fig. 2. This allows the body support wheels to be mounted on the sides of the narower threshing rotor housing portion so that the support wheels ride on ground from which the vines have been removed.

Vine pick-up mechanism

A pair of lifter reel support arms 19 and 20 (Figs. 1, 2, 3, 4 and 5) are rigidly secured to each other by a torque bar 20a (Fig. 5) which is welded at its ends to the arms. The arms 19 and 20 are pivotally mounted on a shaft 26 mounted transversely across the body of the machine and extend forwardly therefrom. The length of the arms is adjustable by means of a telescopically extensible portion 21 secured in adjusted position, by set screws 22 (Fig. 1), in the forward end of each support arm. The lifter reel support arms are shown in a properly adjusted position for the harvesting of peas, although in harvesting some crops it is desirable to shorten the arms somewhat, by means of the adjustment, to position the lifter reel close to the pick-up drum. A pair of counterbalancing coil springs 195 (Figs. 1, 3, 4 and 5) are connected from the rear ends of the arms 19 and 20, which extend rearwardly beyond the pivot shaft 26, to the frame 10.

The lifter reel B is of a conventional type with a power driven spider 23 mounted on one end thereof, a freely rotating eccentrically mounted spider 24 mounted on the other end thereof and connected by levers 24a to a plurality of cross rods 25a to each of which a plurality of tine fingers 25 are secured. By this arrangement the tine fingers 25 are maintained in upright position while the reel B is rotated in the direction of the arrow shown in Fig. 1.

The pick-up drum C comprises a cylindrical body portion 27, with a drive sprocket 28 (Fig. 1) secured to an end thereof. Picking fingers 29 are mounted to project radially through rows of slotted openings in the drum body 27. The fingers 29 are mounted on a usual eccentric actuating mechanism, not shown, mounted internally of the drum body. By means of this well known eccentric actuating mechanism the picking fingers are alternately projected radially outwardly on the lower and forward sides of the drum and then are retracted into the drum on the upper and rearward sides of the drum. The forwardly and downwardly projecting fingers enter into and engage the mass of vines loosened by the lifter reel B and carry the vines up over the top of the pick-up drum C, tending to pull them loose from the ground. As the fingers 29 are retracted inwardly to lie flush with the upper, rearward peripheral surface of the drum, they release the vines for feeding into the machine. This type of pick-up drum is well known to those familiar with the art and it will be unnecessary to describe it in further detail. However the feeding means of the present mechanism which co-operate with the pick-up drum are important to its successful operation as will be pointed out later herein.

The pick-up drum C is journaled between the forward ends of a pair of housings 30 and 31 which are pivotally mounted at their rearward ends on a jack shaft 185 journaled transversely of the main frame 10. A major portion of the weight of the pick-up drum assembly is counterbalanced by a pair of coil springs 198 and 199 which extend from the housings 30 and 31, respectively, to the feed housing 32. A ground engaging wheel 33 (Fig. 2) is journaled on a stub axle secured in adjusted position to the outer side of the left hand housing 30 near its forward end to support the unbalanced weight on the housing. A second ground engaging wheel 34 (Figs. 2 and 3) is journaled on a stub axle on the forward end of a wheel support arm 35 which is clamped in adjusted position to a mounting block 37 pivotally mounted on the outer side of the right hand pivoted pick-up drum support housing 31 near its rear end.

A yoke 38 (Fig. 3) is mounted in vertically adjusted position on the outer side of the right hand pick-up drum housing 31, the upper and lower ends of the yoke being bent to extend outwardly, to engage and limit the upward and downward pivotal movement of the pivoted wheel supporting arm 35 relatively to the drum housing 31. The upper, outwardly extending end portion of the yoke 38 normally rests on the arm 35 to support the unbalanced weight of the right hand end of the pick-up drum and to carry it over any obstacles which the wheel may roll over. However, if the wheel passes across a depression in the ground the yoke 38 permits the lever arm 35 to swing downward relative to the drum housing 31 so that the wheel will follow the depression, continuing to press down on the vines beneath it.

The vine cutoff device D is of the nature of a short mowing machine sickle of an ordinary type, mounted vertically, in the forward end of the right hand drum support housing 31 (Figs. 1, 3 and 4). A usual serrated sickle knife 36 (Fig. 3) of the cutoff device D is adapted to be reciprocated in a usual manner by a bell crank lever 39, which is oscillated by means of a link 40 connected on its rearward end to an eccentric pin mounted on a rotating pulley 41.

The forward ends of the pick-up drum support housings 30 and 31 are beveled inwardly to guide the marginal portion of the swath of vines severed by the cutoff device D inwardly onto the pick-up drum C, which (Figs. 2 and 5) is somewhat shorter than the width of the swath, indicated at X in Fig. 2. The cutoff device cuts a vertical path through the mass of tangled vines which prevents an excess amount of vines being drawn onto the pick-up drum from the unharvested side of the machine. The machine is intended to move around a field of peas being harvested with the left hand side of the pick-up drum following along the marginal edge of the field or of a previously harvested swath. Therefore no cutoff mechanism is required on the left hand side of the machine.

Feed mechanism

Rearwardly of the pick-up drum C a transfer roller 44 is driven to rotate so that its upper surface travels rearwardly. The mass of vines from the pick-up drum C passes rearwardly over the transfer roller 44 and thence (Figs. 1 and 2) onto the forwardly curved lower portion of a smooth, vertical sheet metal feed plate 45, which forms the rear wall of a feed housing 32 for the vertical flight E of paddle bladed feed rotors.

Each of the paddle bladed feed rotors in the flight E thereof, like all of the other paddle bladed rotors in the machine, comprises a sheet metal body portion 47 (Fig. 2) of hollow, generally cruciform, sectional shape, with a forged metal end plug 48 secured co-axially in each end thereof. A preferred diameter for the feed and threshing rotors is approximately seven inches, although generally satisfactory limits are between five and ten inches in diameter.

A short supporting shaft portion 49, is formed concentrically with each of the plug portions 48. Where required this shaft portion extends axially beyond the journal in which it is mounted to receive the various sprockets, gears and pulleys to be described later herein. The feed rotors of the flight E are driven to rotate in a counterclockwise direction as viewed in Figs. 1 and 4, as are all of the other paddle bladed rotors in the machine with the exception of the horizontal row of smaller paddle rotors of the discharge mechanism G which are driven to rotate in the opposite direction.

It will be noted in Figs. 2 and 5 that the housing 32 which encloses the flight E of feed rotors (Fig. 2) is of somewhat lesser width than the length of the pick-up drum C, which in turn is of lesser length than the width X of the swath severed from the mass of vines in the field by the cutoff device D. It will be noted also that the feed rotor housing 32 which encloses the feed paddle rotors E is somewhat wider than the rearward portion of the housing 11 containing the threshing paddle rotors F. A pair of angularly mounted guide plates 42 and 43 are mounted one at each side of the forwardly curved lower portion of the plate 45 to guide the vines from the pick-up drum into the entrance to the feed rotor housing 32.

In order further to reduce the width of the mass of vines as it passes upwardly through the feed housing 32, vine compacting means comprising a plurality of inwardly or centrally inclined deflector vanes 51 are secured to the forward face of the plate 45. These vanes extend into the space between the feed rotors and the plate 45 and tend to compact the mass of vines inwardly toward a vertical longitudinal central plane of the machine. By the time the mass of vines reaches the upper end of the feed housing 32 its width has been reduced approximately to the length of the shorter threshing rotors F.

Threshing mechanism

The upper end of the smooth vertical feed plate 45, forming the rear wall of the feed housing 32, is bent rearwardly and inclined downwardly as at 52 (Fig. 1). The lower end of the inclined rearward portion 52 is substantially tangent to a curved grating 56 (Figs. 1 and 6) formed of a plurality of spaced transversely extending rods 53 mounted loosely in sockets in end frames 46 (Fig. 6). The rods fit into the sockets in end frames 46 with sufficient looseness to allow the rods to vibrate and turn around under frictional engagement with the vines moving across them in a manner to be described later herein. This tends to keep the rods scrubbed clean of accretions of material which otherwise might tend to collect thereon. The grating rods 53 are spaced apart a sufficient distance to allow hulled peas and unopened pods to pass therethrough, but are close enough to each other to support the vine mass passing through the machine.

The lowermost threshing rotor 54 of a first vertical flight 55 thereof is spaced upwardly from the curved grating 56 so that the mass of vines passing rearwardly over the inclined feed plate portion 52 is directed into the space between the curved grating 56 and the lowermost threshing rotor 54. Thence the vines are passed by the rotation of the rotors across the grating 56 and upwardly, from one threshing rotor to the next, between the rear side of the first flight 55 of threshing rotors F and a vertically positioned first screen member 57 (Figs. 1 and 6).

The threshing rotors preferably are arranged so that adjacent ones are similarly positioned as shown in Fig. 1 and are rotated in phase. The spacing between adjacent rotors is such that their blades have a minimum clearance from each other of not less than the diameter of the peas to be threshed. The maximum separation between blades of adjacent rotors is that which will prevent the vines from being carried along from one rotor to the next. With most vine crops this maximum permissible spacing is less than one and one half inches.

Under most crop conditions the threshing rotors are driven preferably at a rate which will produce tip speeds corresponding to those of a rotor seven inches in diameter rotating between 450 and 550 revolutions per minute. Greater or lower tip speeds tend to increase bruising of the peas and to provide less satisfactory recovery.

The screen member 57 illustrated is of woven steel wire, the openings therein being preferably between one half and one inch across. However, if desired, the screen 57 may be of suitable roughened plate material having apertures of the desired size therein. The roughness of the screen is important, since if the screens were smooth the travel of the vines along the screen under the action of the rotors would not be retarded to produce the abrading action which is important in the present invention.

The screens associated with the threshing rotors are mounted for vibratory motion either in the plane of the screen or at an angle thereto. The screen 57 (Figs. 1 and 6) is mounted in a rectangular metal frame 64 having outwardly facing channel members 58 and 59 secured along its lower and upper ends, respectively. These channels are adapted slidably to receive tongues 60 and 61 carried by tubes 62, which are mounted to telescope loosely upon square support rods 63 the ends of which are inserted in box housings 66 (Fig. 6) mounted on opposite sides of the harvesting machine housing 11. The fit of the tongues 60 and 61 in the screen channels 58 and 59, and the fit of the tubes 62 on the support rods 63, and the fit of the rods 63 in their support boxes 66, are sufficiently loose to permit the entire screen assembly to vibrate on its supports under the beating action of the rotor paddles on the other side of the mass of vines from the screen. If desired, usual forms of resilient or power driven mounts may be provided for the screens to provide vibratory movement thereof during threshing operations.

This vibratory movement of the screens assists in the threshing action, and also dislodges matter which otherwise would tend to adhere to the screen. Peas which are hulled by the action of the threshing paddles and the screens on the mass of vines are shaken out of the vines by the virbation to which they are subjected and pass through the openings in the screens or gratings and drop down onto a belt conveyor 73 (Figs. 1, 1A, 3 and 4), along with some unopened pods and other litter.

As the vines pass upwardly beyond the uppermost of the first flight 55 of threshing rotor (Fig. 1), a paddle bladed transfer rotor 67, one of which is mounted with its axis offset rearwardly slightly from each flight of the threshing rotors, directs the upwardly passing mass of vines rearwardly over a transfer grating 65. The grating 65 is formed of a plurality of arched rods 68 which extend from the upper end of the rear screen of each flight of threshing rotors except the last, to the forward screen of the flight next rearwardly therefrom. The vines pass across the rearward side of the grating 65 where they are engaged by the uppermost paddle rotor 69 of a second threshing rotor flight 70 and thence are directed downwardly into the space between the second flight 70 of threshing rotors F and the forward screen 71 thereof.

The forward sides of the threshing paddle rotors of the second flight 70 carry the vines downwardly past the second screen 71 similar to the first one 57 previously described herein. During this downward passage the vines again are subjected to the threshing action of the paddles and screen to hull and shake out the peas in the same manner as that described previously herein for their upward passage under the impulses of the first or leading flight 55 of threshing paddle rotors F.

Additional, generally similar, flights of threshing rotors with their associated transfer means, screens and guide gratings are provided throughout the length of the machine as required. In the illustrated form of the machine, a total of five flights of threshing rotors are employed. Since all of these flights and their associated transfer rotors, screens, and gratings are generally similar to those described previously herein, no additional explanation thereof will be necessary.

At times the propelling effect of the threshing rotors and the relatively opposite retarding effect of the screens will cause some of the vines to be bunched or rolled up into an elongated, cigar shaped mass. If such a roll of vines were permitted to pass entirely through the machine it would not be subjected to proper threshing action and would contain a substantial percentage of the peas intact therein when discharged from the machine. In order to minimize the formation of such rolls, and to prevent them, when formed, from passing entirely through the machine, means are provided to engage an off-center portion of the vine mass passing through the threshing zone and to change its velocity relatively to the rest of the mass. This is accomplished in the illustrated form of the invention by centrally offset means comprising a plurality of diagonally positioned retarding plates 72 (Figs. 1, 2 and 5) mounted at alternately opposite ends of the upper gratings 65.

By retarding the advance of one end of such a rolled up mass of vines, the plates 72 cause the opposite or free end of the roll to be engaged, in advance of the retarded end, by the uppermost threshing rotor of the next succeeding flight thereof. This turns the roll of vines in an endwise direction toward a position at right angles to the axes of the threshing rotors. In such position the subsequent action of the threshing rotors thereon tears up the roll of vines and threshes out the peas therein. A substantial percentage increase in the amount of peas recovered is noted when such endwise turning means are provided to prevent the vine rolls from passing intact through the threshing zone.

*Conveying and cleaning mechanism*

As the mass of vines passes upwardly (Fig. 1A) along the rear side of the last or rearward flight of threshing rotors and approaches the upper end thereof, the threshed out vines are freed to fall rearwardly onto the horizontally aligned row of smaller paddle bladed rotors comprising the discharge conveyor G. These discharge rotors are spaced apart so that the blades of adjacent rotors preferably are separated by a distance closely approximating the maximum diameter of the peas to be threshed, although these discharge rotors may be slightly closer than such diameter without causing damage to an appreciable number of peas. It is desirable to have the discharge rotors quite close together to prevent the vines from wrapping around these rotors and thus interfering with their proper operation. The discharge rotors are driven to rotate in the opposite direction from the feeding and thresher rotors so as to convey the vines rearwardly and discharge them back onto the field. The discharge rotors agitate the mass of vines thereon as they convey it rearwardly, tending to shake out any hulled peas or loose pods which may be entrained in the mass. Such peas and pods pass downwardly between adjacent discharge paddle rotors and drop onto a sheet metal pan 107 which is mounted to closely underlie the discharge rotors. The under side of the discharge rotors sweep the peas and pods forwardly on the pan 107 which terminates within the housing and over the rear portion of a main conveyor belt 73. The peas and pods drop off the forward end of the pan 107 and fall by gravity onto a main conveyor belt 73.

The main conveyor belt 73 is mounted lengthwise of the machine and extends horizontally beneath the entire length of the five flights of threshing rotors to catch the peas and unopened or incompletely threshed pods which drop through the previously described screens and gratings provided therefor. The term "unopened pods" as used herein is also intended to include all pods from which the peas have not been removed. A certain amount of leaves and other litter, most of which is of lower specific gravity, or at least more easily air borne by a blast of air, than the peas and unopened pods, also drop down onto the main conveyor belt 73. This litter, along with the hulled peas and unopened pods, is carried rearward and is discharged over the rear end of the main conveyor, which is separated from the forward end of a second, short conveyor belt 80 by a gap 81.

A first blower 78 (Figs. 1A, 3 and 4) is provided with a discharge duct 79 adapted to discharge an angularly upwardly and rearwardly directed air blast through the gap 81. This air blast is of sufficient intensity to blow the relatively lighter litter, such as empty hulls, leaves, dust, and the like, upwardly and rearwardly entirely beyond a first litter conveying belt 82. The first litter conveying belt 82 is connected at its forward end to the frame 10 of the machine by a pair of pivotally mounted slotted links 82a (Figs. 1A and 3), which allow limited vertical and fore-and-aft adjustment of the lower forward end of the inclined litter belt 82. The rearward end of this first litter belt 82 is connected for vertical adjustment to a pair of slotted links 86 pivotally mounted on a bracket on the frame of the discharge conveyor G.

The velocity of the air blast is adapted to be controlled by an adjustable vane 96 mounted in the outlet duct from the first blower 78. The velocity of the blast is regulated and the position of the forward end of the first litter belt 82 is adjusted so that the peas and filled pods, being of greater specific gravity than most of the litter, fall through the air blast directly onto the second horizontal conveyor belt 80. To facilitate this initial separation it will be noted that the forward end of the first litter conveying belt 82 is adapted to be mounted sufficiently rearwardly of the discharge end of the main conveyor belt 73 to lie beyond the trajectory of peas and unopened pods falling through the air blast. Most of the peas and pods passing through the air blast fall directly onto the second conveyor belt 80.

Material of intermediate specific gravity, such as pieces of stem, and other matter including a few peas and filled pods, drop out of the air blast onto the litter conveyor belt 82. The belt 82 is vibrated by a non-circular upper rear roller 84 thereof, the forward roller 83 of the belt 82 being round. The vibration of the belt 82 causes most of the peas and many of the full pods which fall thereon to roll down the belt and to drop off onto the second conveyor belt 80.

A rotary belt wiper 85 is mounted to have wiping contact with the lower or return run of the litter conveyor belt 82. The wiper 85 comprises a rotary hub portion with a pair of wiping blades 87 clamped thereto and is rotatably driven to move the outer edges of the blades 87 counter to the direction of travel of the lower run of the first return belt 82.

The second conveyor belt 80 is adapted to discharge the material thereon rearwardly, past a second gap 88 and onto a narrow, lateral conveyor belt 89 (Fig. 1A). A second blower 90 is mounted to discharge a blast of air upwardly and rearwardly through the second gap 88 to blow any of the lighter material which may remain on the second conveyor belt 80 rearwardly out of the machine. The intensity of this air blast, like that of the first, is regulated so that the relatively heavier hulled peas and filled pods will fall through the air blast onto the lateral conveyor belt 89, while the relatively light litter is blown rearwardly, either entirely out of the machine or onto a second sloping litter conveying belt 91 similar to the previously described belt 82.

The forward end of the second litter conveying belt 91 is mounted on a pair of pivoted slotted links 91a for limited vertical and fore-and-aft adjustment similarly to the first litter conveying belt 82, and the rear upper end of the second litter conveying belt is connected for vertical adjustment to a pair of pivoted slotted links 106 similar to the links 86. A stationary wiper blade 92, which may comprise a strip of rubber belting material, is mounted to have wiping cleaning engagement with the lower run of the second litter conveying belt 91. With some types of crops better results are obtained by omitting the first litter conveying belt 82 entirely, or by shortening it to a degree where it extends only sufficiently to protect the transverse receiver belt 89 from a litter falling out of the first air blast.

The lateral conveyor belt 89 (Figs. 1A, 4 and 5) is adapted to discharge the material thereon, consisting principally of hulled peas and filled pods, into a hopper 93, the lower end of which opens into the lower end of the housing 94 of the elevator I. An elevator belt 95, with usual buckets or blocks 97 thereon, elevates the hulled peas and pods from the hopper 93 and discharges them from the upper end of the elevator into the open rear inlet end of the perforated, rotating, cylindrical pod separating drum K (Figs. 2, 4 and 5).

The drum K is mounted along one side of the machine somewhat above the inclined upper portion 52 of the feed plate 45. The perforations in the peripheral wall of the drum K are of a size to permit the hulled peas to pass therethrough, but to retain any unopened pods which may be in the drum. A helical conveyor vane 98 is secured to the inner side of the peripheral wall of the drum to convey the material therein gradually forwardly, so that the unopened pods, which are incapable of passing through the perforations in the peripheral wall, will be worked forwardly in the rotating drum and discharged through the open forward outlet end 99 thereof. A sloping pod return chute 100 (Fig. 2) is mounted to receive the unopened pods thus discharged from the drum and to convey them by gravity (Fig. 2) back into the machine. The pods are discharged from the lower end of the chute onto the mass of vines as they pass across the rearwardly inclined upper portion 52 (Fig. 1) of the feed plate 45.

A hopper L is mounted beneath the pod separating drum K to catch the peas passing outwardly through the perforations in the drum K. A pair of discharge control slides 102 are provided to control the flow of peas from the hopper L into usual field boxes, shown in broken lines in Fig. 4, which may be placed on a platform 103 provided therefor over the wheel 104. A folding platform 105 is hingedly mounted on the side of the machine adjacent the hopper L to provide working space for the operator. The platform is adapted to be swung upwardly alongside the platform 103 to reduce the width of the machine when transporting it along a road or highway.

If desired the hopper L may be arranged to discharge the peas into an elevator for elevating and discharging them into a truck driven alongside the threshing machine. This is a common practice with other types of threshing machines. It forms no part of the present invention and therefore is neither illustrated nor described herein.

Drive mechanism

The drive mechanism of the illustrated machine comprises principally a series of sprockets, chains, pulleys and belts. From sprockets secured to the takeoff shaft (Figs. 1, 2, 3 and 5) of the speed-reducer 15, driven by the engine 12, the two main drive chains 17 and 18 are passed around sprockets 110 and 111, respectively.

The sprocket 111 is mounted on the right hand end of a jack shaft 112 which extends through the housing 11 of the machine and has a sprocket 113 (Figs. 1, 2 and 4) on its other or left hand end. A chain 114 passes around the sprocket 113 and also around a sprocket 115 on the left hand end of the lowermost threshing paddle rotor 54 in the first flight 55 of threshing rotors F. The shaft of the lowermost threshing rotor of each flight thereof has a double sprocket on its left hand end, whereby, by means of a plurality of short drive chains 117, (Figs. 1, 1A and 4) each of said double sprockets except the rearmost drives the one rearwardly thereof, and, except the foremost, is driven by the one forwardly thereof (Figs. 1 and 1A).

A double sprocket 118 (Figs. 1A and 4) is journaled on a stub shaft mounted on the left side of the body housing 11 near the rear end thereof. One portion of this double sprocket is adapted to ride on the upper run of the rearmost short drive chain 117. The other portion of the double sprocket 118 drives a chain 119, which passes beneath an idler sprocket 120, around a sprocket 121 mounted on the shaft of the rear driving roll 75 of the main conveyor belt 73, and also around a sprocket 122 mounted on the shaft of the forward roll of the rearward or second conveyor belt 80.

A grooved pulley 127 also is mounted on the shaft of the forward roll of the rear conveyor 80, and a V-belt 128 passes around this pulley 127 and also around a pulley 129 which is mounted on the shaft of the lower forward roll of the first litter conveyor belt 82. Thence the belt 128 passes around an idler pulley 130, around a pulley 131 mounted on the shaft of the forward roll of the second litter conveyor belt 91, and around a grooved pulley 132 (Fig. 3) which drives a bevel gear 133 (Fig. 1A). The bevel gear 133 is in meshed engagement with a second bevel gear 134 mounted on the shaft of one of the rolls supporting the narrow lateral conveyor belt 89. From the pulley 132 the belt passes beneath an idler pulley 135 and back to its drive pulley 127.

For driving the two blower fans 78 and 90 a large grooved pulley 137 is secured to the shaft of the lowermost threshing paddle rotor in the rearmost flight thereof (best shown in Fig. 1A). From this pulley 137 a belt 138 passes downwardly around a relatively small pulley 139 on the shaft of the first blower 78, thence upwardly and over an idler pulley 140, downwardly and around a pulley 141 on the shaft of the second blower fan 90, and thence over an idler pulley 142 and angularly upwardly and forwardly back to the large driving pulley 137.

The right hand end of each threshing paddle rotor shaft with the exception of the lowermost has a double sprocket mounted thereon. The lowermost ones, and the shafts of the transfer rotors associated therewith, have single sprockets on their right hand ends. A series of short chains 143 (Fig. 3) connects the sprockets of the threshing and transfer rotors with those next above and below them, so that all of said threshing and transfer rotors thus are driven in unison and in the same direction.

From a sprocket 147 secured on the left hand end of the shaft of the uppermost paddle rotor of the rear flight thereof (Figs. 1A and 7) a chain 148 passes forwardly and around a sprocket 149 secured on the shaft of the upper roll of the elevator I. The chain 148 passes beneath the largest sprocket portion 150 of a triple sprocket member 151 journaled on a stub shaft secured to a side of the housing 11. Thus the chain 148 drives the elevator I, and rotates the triple sprocket member 151 at reduced speed.

A chain 152 passes around a second sprocket portion 153 of the triple sprocket member 151, and thence angularly downwardly and rearwardly, on opposite sides of the shaft of the upper rear threshing rotor and around a sprocket 154 secured to the shaft of the foremost rotor 155 of the discharge conveyor G. The remaining discharge paddle rotors are connected to this rotor 155 by a suitable chain and sprocket drive 157 (Fig. 3) to drive all of the discharge rotors at the same speed and in the same direction as the foremost one 155 thereof.

A chain 158 (Figs. 1A and 7) passes around the third and smallest sprocket portion 159 of the triple sprocket member 151 and also around the sprocket portion 160 of a combined sprocket and grooved pulley member 161. The member 161 is journaled to rotate freely on the shaft of the upper rear threshing paddle rotor. An idler sprocket 162 is provided to take up slack in the chain 158.

For rotating the perforated pod separating drum K (Figs. 2, 3, 4, 5 and 7) a round rubber belt 164 passes around the grooved pulley portion 165 of the combined sprocket and pulley member 161. The lower run of the belt 164 from the pulley portion 165 passes around a horizontally disposed pulley 167 (Figs. 1A, 2 and 7) pivotally mounted on the laterally projecting arm of an angle bracket 168 (Fig. 2) which in turn is secured to the side of the elevator housing 94. Thence the belt 164 passes horizontally beneath, and then upwardly and around, the perforated pod separating drum K. From the inner side of the drum the belt 164 passes downwardly, beneath a vertically disposed pulley 169 pivotally mounted on the other side of the angle bracket 168 from the horizontal grooved pulley 167, and thence back to the grooved pulley portion 165 of the member 161.

The upper main drive chain 17 from the speed reducer 15 (Figs. 1 and 3) passes around a sprocket 110 on the right hand end of the shaft of the feed transfer paddle rotor 50. A series 171 of double sprockets and short chains (Figs. 2 and 3), are provided, also on the right hand side of the machine to drive the feed rotors of the flight E in the same manner as described previously herein for the vertical flights of threshing paddle rotors.

A sprocket 172 (Fig. 1) is mounted on the left hand end of the shaft of the uppermost feed paddle rotor, and a chain 173 passes around the sprocket 172 and around one portion of a double sprocket 174, journaled on the pivotal support shaft 26 for the lifter reel arms 19 and 20, (Fig. 2). A chain 180 passes around a second portion of the double sprocket 174 (Figs. 1 and 2) and also around a sprocket 181 mounted to drive the lifter reel B. A sprocket 182 (Fig. 1) also is secured to the shaft of the lowermost feed rotor, and a chain 183 passes around this sprocket, around an idler sprocket 184, around a sprocket secured to a jack shaft 185, and around a sprocket 187 secured to the shaft of the small transfer roller 44 just rearwardly of the upper side of the toothed pick-up drum C. A chain 188 also passes around the sprocket on the jack shaft 185 and around the sprocket 28 of the pick-up drum C.

For elevating the lifter reel B, the pick-up drum C, and their associated parts to an inoperative position, a cable 190 is conected to the rearwardly extending end of the lifter reel support arm 20 (Fig. 1). The cable 190 passes beneath pulley 191 mounted on the thresher frame 10, and thence forwardly, where it is connected to suitable actuating means, not shown, for operation by the tractor operator.

Chains 193 and 194 are connected between the spring counterbalanced lifter reel support arms 19 and 20 and the similarly counterbalanced pivoted end housings 30 and 31 of the pick-up drum C, so that when the lifter reel B is swung upwardly to inoperative position by the tractor operator, the pick-up roll C also will be swung upwardly therewith. The chains are of sufficient length so that when the lifter reel B is lowered to its operating position, as shown in Figs. 1, 3 and 4, the chains will hang slack and will not interfere with the normal pivotal movement of the pick-up drum housings 30 and 31 as their support wheels 33 and 34 follow irregularities in the terrain over which they pass.

*Operation*

Assuming that the machine is at one side of a field of peas wherein the pea vines are more or less matted together on the ground in the usual manner of such fields, the machine preferably is headed so that an initial swath will be cut with the left hand side of the machine following along an edge of the peas in the field so that the vertical cutter D will sever a strip of vines of the desired swath width indicated at X in Fig. 2. Thereafter the machine preferably is operated so that the cutter D will remain on the unharvested side of successive swaths to be cut.

With the engine 12 operating and connected by usual clutch means, not shown, to drive the main drive chains 17 and 18, the various mechanisms are driven as described previously herein. The tractor operator lowers the lifter reel B to a desired adjusted position, by slackening off the cable 190 to a desired degree. With the lifted reel thus lowered, the chains 193 and 194 are of sufficient length to lower the pick-up drum to supported position on its ground engaging wheels 33 and 34.

The tines of the lifter reel B enter into the mass of vines in the usual manner for such reels, and, by lifting the vines slightly and in effect combing them rearwardly, they position the vines so that the eccentrically supported fingers 29 of the pick-up drum C, in their projected position on the forward side of the drum, can enter into the mass and engage the vines and carry them upwardly and rearwardly over the top of the drum. The springs 198 and 199 allow a portion of the weight of the pick-up drum assembly to remain unbalanced and this unbalanced weight is supported by the pick-up drum support wheels 33 and 34.

When operating over smooth terrain the pivoted arm 35 upon which the right hand pick-up drum support wheel is mounted abuts against the outturned upper end of the yoke 38 to support the pick-up drum with the lower end of the sickle D just above ground level and to elevate it when the wheel passes over a bump on the ground. Should the wheel 34 pass over a hole or depression in the ground however, the lever arm 35 allows the wheel to swing downward and remain in pressing contact with the vines beneath it. This is important with some vines which are difficult to cut, since the wheel pressure tends to grip the vines on the field side and to draw any unsevered vines which might start to bunch up ahead of the sickle into the serrations between the sickle teeth for severing The vertical cutter D severs the vines along the right hand side of the swath being harvested, and the beveled forward sides of the pivoted pick-up drum end housings 30 and 31 guide the sides of the vine mass laterally inwardly onto the pick-up drum. As the vines are carried up over the top of the pick-up drum (Figs. 1 and 2) the transfer roller 44 prevents the vines from following down the rear side of the pick-up drum and directs them rearwardly onto the forwardly curved apron 123 at the lower end of the feed housing 32. Here the vines are seized between the plate 45 and the lowermost feed rotor of the flight E thereof. The tension exerted on the vines by the action of the feed rotors, plus the action of the drum fingers 29, pulls the vines loose from the ground.

As the fingers 29 pass rearwardly beyond the top of the drum, they are retracted into their slots to lie flush with the rearward upper side of the drum, thereby releasing the vines. Occasionally tough and firmly rooted vines will successfully resist the combined pulling action of the pick-up drum and feed rotors, but the leaves and pods are stripped from such vines and are carried up into the threshing mechanism with the other vines. The detached mass of vines is carried upwardly between the rear sides of the feed rotors and the smooth rigid feed housing plate 45.

The smoothness and rigidity of the plate 45, reduces to a minimum any threshing action the feed paddles might have on the vines, so that they are carried up with a minimum loss of peas and pods. The vines are subjected to very little vibration during this upward feeding pass, and therefore such pods and peas as may be freed during this feeding pass are mostly carried up with the vines. As the vines reach the top of the vertical flight E of feed rotors the feed transfer rotor 50 directs the vines rearwardly over the inclined upper end portion 52 of the plate 45.

During this upward travel of the vines past the feed rotors, the inwardly inclined vanes 51 on the plate 45 compact the mass of vines laterally to a width corresponding approximately to the length of the threshing rotors of the subsequent flights thereof. As the vines pass downward over the rearwardly inclined upper portion 52 of the feed housing plate 45, they are directed thereby onto the substantially tangent curved grating 56 (Figs. 1 and 6) and thence into the space between the grating 56 and the lowermost threshing paddle 54 of the first vertical flight 55 thereof.

Here the vines are seized between the threshing paddle 54 and the grating 56 and are carried up between the rear sides of succeeding superposed threshing paddle rotors of this flight and the loosely mounted first screen 57. The screen 57 is vibrated by the beating of the paddle rotors against the opposite side of the mass of vines therefrom. The rough surface of the screens tends to retard the advancing movement of the mass of vines by the rotors. Thus the mass of vines is beaten and abraded, tending to burst open the pods of peas therein and to shake the hulled peas from the mass and through the apertures in the screen 57. A small proportion of unopened pods also are knocked loose from the vines and pass through the openings in the screen.

The vibratory self-cleaning movement of the screens, which is produced in the illustrated mechanism by the action of the paddle blades on the loosely mounted screens, can of course be made more positive by mechanical vibrating means of numerous well known types. Also we have found that when the machine is operating, the screens can be cleaned effectively merely by brushing them slightly with a mechanically actuated brush or even with one's hand. The provision of suitable mechanically actuated screen vibrating or brushing means is contemplated where required on crops having an unusual tendency to clog the screens.

On advancing beyond the top of the first screen 57, the vines are engaged by the first threshing transfer rotor 67 and are diverted thereby rearwardly across the arched rods 68 of the first upper grating 65. Here gravity carries them downwardly again, and they enter the space between the second screen 71 and the forward side of the second vertical flight of threshing rotors where the threshing process described for the first flight of threshing rotors is repeated. The lower grating 56 beneath the second flight of threshing rotors is similar to that beneath the first flight, and guides the vines around the underside of the lowermost rotor and into the space between the rear side of the flight and the screen spaced therefrom. Thus the vines are advanced through the machine in a tortuous path, down the forward side and up the rearward side of successive flights of threshing rotors, and across the transfer gratings 65 from one flight of threshing rotors to the next.

The screens can be inspected by opening or removing the door panels 16 in the side of the housing 11. The door panels are of a width to expose the ends of the two screens which are mounted between adjacent flights of threshing rotors, so that the screens can be slidably withdrawn for inspection or cleaning or to expose the rotors associated therewith.

As the vines pass over the arched upper gratings 65 between adjacent flights of threshing rotors, a diagonally disposed retarding plate 72, extending out into the path of the vines, engages the end of any rolled up mass of vines which may have been formed by the action on the vines of opposing advancing and retarding forces of the paddles and screens, respectively. With one end of any such roll of vines thus retarded by engagement with the plate 72, the free end of the roll advances across the grating 65 and is seized by the threshing rotors of the next flight thereof beyond the retarding plate, so that the roll of vines is turned endwise and is introduced one end in advance of the other into the space between the next flight of threshing rotors and its associated screen. This exposes the vines in the roll to the threshing action of the succeeding threshing rotors and screens.

As the threshed out vines reach the upper portion of the rear side of the rearmost flight of threshing rotors (Fig. 1A) they tend to fall by gravity rearwardly onto the discharge conveyor G where the rotors thereof convey the vines rearwardly and discharge them through a spout 76 back onto the field. During their rearward travel the threshed out vines are constantly vibrated by the action of the discharge rotors, so that any hulled peas or loose pods entrained therein will be shaken out and passed downwardly between adjacent discharge rotors onto the pan 107 therebeneath, whence they are swept along by the rotors of the discharge conveyor G and drop off the forward end of the pan onto the main conveyor 73.

The peas threshed out of the vines during their passage through the machine pass through the various screens or gratings adjacent the threshing rotors and drop downward onto the main conveyor belt 73, which transports them rearwardly and discharges them off the rearward end thereof and downwardly through the air blast issuing from the gap 81 between the first and second conveyor. The velocity of the air blast issuing from the first air gap 81 and the position of the forward end of the first litter conveying belt 82 are controlled and adjusted so that the trajectories of the peas and unopened pods falling through the blast will carry the peas and pods just short of the litter conveying belt 82 and onto the second horizontal conveyor belt 80. The air blast blows very light litter including pieces of leaves, dust and the like entirely beyond the first litter conveying belt 82, while material of intermediate specific gravity including a few peas and unopened pods drops out of the blast onto the litter conveying belt 82. The litter conveying belt 82 carries such litter rearwardly and discharges it onto the second litter conveying belt 91. The vibration of the litter conveying belt induces any hulled peas and filled pods which may be blown onto it to roll downward and drop onto the second horizontal conveyor belt 80.

The second conveyor belt 80 discharges the material thereon past the second gap 88 where the air blast from the second blower 90 is controlled, and the position of the forward end of the litter conveying belt 91 is adjusted so that the normal trajectories of the hulled peas and filled pods passing through the second air blast will not carry them onto the second litter conveying belt 91 but will cause them to fall directly onto the lateral conveyor 89. The upper ends of the litter conveying belts 82 and 91 may be adjusted to control the inclination of the belts by means of the adjustments provided by the slotted links 86 and 106, respectively. This adjustment is easily made by the operator, and frequently becomes necessary several times during a day as the moisture or other characteristics of the vines vary.

In many instances better recovery of peas is made with the first litter conveying belt entirely removed, or it may be made shorter than illustrated, for example of a length where it just protects the lateral conveyor belt 89 from litter falling out of the first air blast. Also it is contemplated that the direction of travel of the first litter conveying belt be reversed so that all material falling thereon will be carried forwardly and returned to the main conveyor belt. With any of such arrangements the air blast from the first blower 78 blows the very light litter rearwardly, either alone or with a subsequent assist from the second air blast, to a point rearwardly beyond the lateral conveyor 89. With the lighter litter which tends to obstruct the air stream thus cleared out, the relatively heavier but cleaner litter can be removed more effectively by the second air blast.

The hulled peas and filled pods are carried laterally by the transversely extending receiving belt 89 and are discharged into the elevator hopper 93, whence the elevator I carries them upward and discharges them into the pod separating drum K.

The pod separating drum K (Figs. 2 and 7) is driven by the belt 164 in a direction to rotate the helical conveyor 98 mounted therein so as to advance the contents of the drum toward the forward outlet end thereof. The hulled peas pass through the perforations in the drum K, while the pods, being too large to pass through the perforations, are conveyed forwardly and discharged out of the open forward end of the drum into the sloping return chute 100 (Fig. 2). The pods slide by gravity down the chute 100 and drop onto the mass of vines passing downwardly and rearwardly over the rearwardly inclined upper portion 52 of the plate 45 for a second pass through the threshing mechanism.

Access to the interior of the machine is provided by the removable door panels 16 in the side of the housing which (Figs. 3 and 6) open into the space between adjacent screens. The screens can be removed for cleaning or to expose the paddle rotors by sliding the screen endwise out of the door opening of the door 16 to free the channel members 58 and 59 on the screen from the tongues 60 and 61 on the tubular support members 62. Removal of the screens frees the rods 63 which support the gratings (Fig. 6) for elevation from their box housings 66, thereby freeing the lower gratings for removal.

In transporting the machine along a road or highway the lifter reel B is swung by the tractor operator to an elevated position by means of the forwardly extending runs of the cables 190 (Fig. 1). The chains 193 and 194 simultaneously swing the pick-up drum assembly upwardly, raising the wheels 33 and 34 from ground engagement. By swinging the hinged platform 105 upwardly to a vertical position alongside the machine and securing it in such position by suitable latch means, not shown, the width of the machine may be reduced to avoid obstruction of traffic.

While we have described a preferred embodiment of the present invention it will be understood however that various changes and modifications may be made in the details thereof without departing from the spirit and scope of the appended claims.

Having thus described the invention what we claim, and desire to protect by Letters Patent is as follows:

1. A threshing machine comprising a housing, means for introducing pea vines into said housing, a plurality of apertured vine supports mounted in parallel, spaced relation in said housing, each support having a continuous substantially flat abrading surface, a plurality of paddle bladed rotors mounted consecutively in close side by side relation on substantially parallel axes adjacent each of said supports and spaced therefrom, means for feeding the vines into the spaces between each plurality of rotors and its adjacent support, drive means for rotating said rotors, the blades of said rotors and the apertured supports co-acting to hull and dislodge peas on said vines, guide means mounted beyond an end rotor of each plurality thereof to guide vines from the space between one of said supports and the rotors adjacent thereto toward the space between another of said supports and the rotors adjacent thereto, and means mounted beneath the supports to catch peas dropping through the apertures therein.

2. In a threshing machine, a housing, a plurality of upright, spaced apart pairs of generally planiform, apertured vine supports mounted one behind the other in said housing, a plurality of paddle bladed rotors mounted between each pair of vine supports and spaced therefrom, feed means mounted to guide vines into the space between an initial rotor at one end of one plurality thereof and an associated support, apertured guide means interposed between a pair of supports for guiding the vines around a rotor at the opposite end of the plurality thereof from said initial rotor, apertured guide means connecting adjacent apertured supports of successive pairs thereof to guide the vines from one plurality of rotors to the next, drive means mounted to rotate said rotors to advance the vines along a tortuous path between successive apertured supports and their associated rotors, said bladed rotors being so positioned relative to said supports that the vines therebetween are forced by each successive blade against the supports whereby to hull and dislodge peas on said vines, and means mounted beneath the supports to catch peas dropping through the apertures in said guide means and said supports.

3. In a threshing machine a first plurality of juxtaposed paddle bladed threshing rotors mounted one above the other, a first substantially vertical screen mounted alongside said rotors and spaced therefrom, means for introducing a mass of pod-carrying vines into the space between said first plurality of rotors and said first screen, a second plurality of paddle bladed threshing rotors mounted side by side in a substantially vertical row, a pair of screens mounted one on each side of said second plurality of rotors and spaced therefrom, an end of one screen of said pair thereof being positioned adjacent an end of the first plurality of rotors and the first screen, means for rotating the rotors of both pluralities thereof to advance a mass of vines along the spaces between the rotors and their respective screens, means for directing the vine mass from the space between the first plurality of rotors and the first screen to the space between the second plurality of rotors and a screen of said pair thereof, and guide means mounted intermediately of the pair of screens and spaced from a rotor of the second plurality thereof for guiding the vines from a space between one screen of said pair and its rotors to the space between the other screen of said pair and its rotors, the paddle blades of each rotor being effective to contact the vines to dislodge the pods and to drive the vines and pods against the screens.

4. A threshing machine comprising a housing, means for introducing pea vines into said housing, a plurality of substantially vertical flights of paddle bladed threshing rotors spaced apart and arranged in succession in said housing, the rotors of each flight thereof being closely adjacent each other, a pair of screens mounted between each succeeding flight of rotors, each of said screens being spaced from an adjacent flight of rotors and from the other of said pair, a screen on an opposite side of one of said flights from the adjacent pair of screens between said flights, a first grating connecting the upper end of one screen of each pair thereof with the corresponding end of the other screen of the pair, a second grating connecting the lower end of one screen of each pair to a corresponding end of the screen on the opposite side of one of said flights, means for guiding said vine supply to an initial rotor of an initial flight thereof, means for simultaneously rotating said rotors to advance said vine supply from said initial rotor, along a tortuous path in the spaces between the rotors of said flights and said screens, and across said gratings, means mounted beneath the screens and gratings to collect peas passing therethrough, and means for discharging the vines at the terminal end of said tortuous path.

5. In a threshing machine, a vertically disposed flight of paddle bladed rotors, a vine support mounted alongside said flight and spaced from the rotors thereof and having an abrading surface, means for introducing a mass of vines into the space between the lowermost flight rotor and the support, a transfer rotor mounted above said support and said flight of rotors, and offset from said flight of rotors in a direction toward said support, and drive means connected to rotate said rotors to advance the vine mass upwardly between the flight rotors and the abrading surface of said support and thence transversely of the support.

6. In a threshing machine a first plurality of paddle bladed threshing rotors, a first screen mounted alongside said rotors and spaced therefrom, means for introducing a mass of vines into the space between an initial rotor of said first plurality thereof and said first screen, a second plurality of paddle bladed threshing rotors and a second spaced screen mounted adjacent a terminal end of the first plurality of rotors and the first screen, means for rotating the rotors of both pluralities thereof to advance the vines along the spaces between the rotors and their respective screens, means mounted on the discharge side of said first plurality of rotors for transferring the vine mass from the space between the first plurality of rotors and the first screen into the space between the second plurality of rotors and the second screen, and a retarder mounted between said first plurality of rotors and said second plurality of rotors and extending part way into the path of movement of the vine mass to intercept and retard an end of any rolls of vines produced by the action on the vine mass of the first plurality of rotors and first screen continued movement of the other ends of the rolls causing the rolls to assume a position transverse to the axis of the threshing rotors.

7. In a threshing machine a plurality of paddle bladed threshing rotors, a screen mounted alongside said rotors and spaced therefrom, means for introducing a mass of vines into the space between said rotors and said screen, means for rotating the rotors to advance the mass of vines along the space between the rotors and the screen, opposed flat wall members defining the marginal edges of the path of the vines along said space, and means mounted to project inwardly from one side wall at a point opposite an unobstructed portion of the other side wall to intercept the vine mass at one side of the center thereof to retard the movement of the intercepted portion of the mass as the unobstructed portion of the mass is continuously advanced by said rotors, thereby to tilt toward an endwise position any rolls of vines produced by the action on the vine mass of the rotors and screen.

8. A threshing machine comprising a first row of bladed rotors mounted in closely spaced juxtaposed relation for rotation about parallel axes, a first screen having a flat surface mounted alongside said first row of rotors, means for introducing a mass of pod-carrying vines into the space between said first row of rotors and said flat surface, a second row of bladed rotors mounted in closely spaced side-by-side relation adjacent said first row, a pair of screens mounted one on each side of said second row of rotors and spaced therefrom, an end of one screen of said pair thereof being positioned adjacent an end of the first row of rotors and the first screen, means for rotating the rotors of both rows thereof to advance a mass of vines along the spaces between the rotors and their respective screens, means for directing the vine mass from the space between the first row of rotors and the first screen to the space between the second row of rotors and a screen of said pair thereof, and guide means mounted intermediately of the pair of screens and spaced from a rotor of the second row thereof for guiding the vines from a space between one screen of said pair and its rotors to the space between the other screen of said pair and its rotors, the paddle blades of each rotor being effective to contact the vines to dislodge the pods and to drive the vines and pods against the screens.

9. A threshing machine comprising a housing, means for introducing pea vines into said housing, a plurality of rows of paddle bladed threshing rotors spaced apart and arranged in succession in said housing, the rotors of each row being closely adjacent each other, a pair of abrading members mounted between each succeeding row of rotors, each of said abrading members being spaced from an adjacent row of rotors and from the other of said pair, an abrading member on an opposite side of one of said rows from the adjacent pair of abrading members between said rows, a first grating connecting a first end of one abrading member of each pair thereof with the corresponding end of the other abrading member of the pair, a second grating connecting the opposite end of said one abrading member of each pair to a corresponding end of the abrading member on the opposite side of one of said rows, means for guiding said vine supply to an initial rotor of an initial row thereof, means for simultaneously rotating said rotors to advance said vine supply from said initial rotor along a tortuous path in the spaces between rotors of said rows and said abrading members, and across said grating, means mounted beneath the gratings to collect peas passing therethrough, and means for discharging the vines at the terminal end of said tortuous path.

10. In a threshing machine, a support structure, a screening member operatively associated with said structure, mounting means loosely supporting said screening member for limited vibratory movement relative to said support structure, a plurality of paddle bladed threshing rotors mounted in axially parallel relation adjacent said screening member to provide a space between said rotors and said member, means for introducing a supply of vines into said space in quantity substantially to fill such space, and means for rotating said rotors in a direction to advance the vines toward succeeding rotors of said plurality, the blades of each rotor being arranged to pass close to said screening member to successively drive vines thereagainst to vibrate said screening member and to thresh said vines.

11. A threshing machine as defined in claim 10, wherein said screening member is disposed vertically in said support structure.

(References on following page)

References Cited in the file of this patent

UNITED STATES PATENTS

| Number | Name | Date |
|---|---|---|
| 460,914 | Finch | Oct. 6, 1891 |
| 513,911 | Gaither | Jan. 30, 1894 |
| 536,652 | Prior | Apr. 2, 1895 |
| 581,073 | Ketchum | Apr. 20, 1897 |
| 591,001 | McCue | Oct. 5, 1897 |
| 608,325 | Farrall et al. | Aug. 2, 1898 |
| 680,097 | White | Aug. 6, 1901 |
| 795,498 | Empson | July 25, 1905 |
| 1,257,192 | Crawford et al. | Feb. 19, 1918 |
| 1,431,372 | Choate | Oct. 10, 1922 |
| 1,585,243 | Hanselman | May 18, 1926 |
| 1,667,428 | Mason | Apr. 24, 1928 |
| 1,669,632 | Stuart | May 15, 1928 |
| 1,689,314 | Worthington | Oct. 30, 1928 |
| 1,821,316 | Oakes | Sept. 1, 1931 |
| 1,948,975 | Urschel | Feb. 27, 1934 |
| 2,084,935 | Bott | June 22, 1937 |
| 2,157,716 | Muller | May 9, 1939 |
| 2,277,450 | Parr | Mar. 24, 1942 |
| 2,297,998 | Dray | Oct. 6, 1942 |
| 2,325,862 | Jepson | Aug. 3, 1943 |
| 2,328,015 | Holmes | Aug. 31, 1943 |
| 2,362,492 | Livermon | Nov. 14, 1944 |
| 2,472,053 | Dorfan | May 31, 1949 |
| 2,513,963 | Patterson | July 4, 1950 |
| 2,589,440 | Sharpe | Mar. 18, 1952 |

FOREIGN PATENTS

| Number | Country | Date |
|---|---|---|
| 13,065 | Great Britain | of 1850 |

UNITED STATES PATENT OFFICE
CERTIFICATE OF CORRECTION

Patent No. 2,742,045                                                             April 17, 1956

Edward J. Schaaf et al.

It is hereby certified that error appears in the printed specification of the above numbered patent requiring correction and that the said Letters Patent should read as corrected below.

Column 2, line 71, for "lifted" read -- lifter --; column 7, line 18, for "rotor" read -- rotors --; column 10, line 17, for "the", second occurrence, read -- an --; column 12, line 52, for "lifted" read -- lifter --; column 18, line 51, for "grating" read -- gratings --.

Signed and sealed this 1st day of March 1960.

(SEAL)

Attest:

KARL H. AXLINE
Attesting Officer

ROBERT C. WATSON
                                                                                           Commissioner of Patents